United States Patent
Moore et al.

(10) Patent No.: US 8,904,062 B2
(45) Date of Patent: Dec. 2, 2014

(54) NETWORK CONTROL MODEL DRIVER

(75) Inventors: Terrill M. Moore, Trumansburg, NY (US); Mats Webjorn, Spanga (SE)

(73) Assignee: MCCI Corporation, Ithaca, NY (US)

( * ) Notice: Subject to any disclaimer, the term of this patent is extended or adjusted under 35 U.S.C. 154(b) by 0 days.

(21) Appl. No.: 13/537,158

(22) Filed: Jun. 29, 2012

(65) Prior Publication Data

US 2013/0007313 A1 Jan. 3, 2013

Related U.S. Application Data

(60) Provisional application No. 61/503,285, filed on Jun. 30, 2011.

(51) Int. Cl.
G06F 3/00 (2006.01)
G06F 13/40 (2006.01)
H04L 12/805 (2013.01)

(52) U.S. Cl.
CPC ............... *H04L 47/36* (2013.01); *G06F 13/40* (2013.01)
USPC .............................................. 710/39; 710/313

(58) Field of Classification Search
CPC ................................. H04L 47/36; H04L 69/24
USPC .............................................................. 710/39
See application file for complete search history.

(56) References Cited

U.S. PATENT DOCUMENTS

| | | | |
|---|---|---|---|
| 6,842,797 B1 * | 1/2005 | Lawande | 710/35 |
| 7,035,948 B1 | 4/2006 | Liang et al. | |
| 7,310,717 B2 * | 12/2007 | Nishino et al. | 711/165 |
| 7,555,578 B2 * | 6/2009 | Lim et al. | 710/52 |
| 7,865,636 B2 * | 1/2011 | Jiang et al. | 710/53 |

FOREIGN PATENT DOCUMENTS

WO WO 99/63448 12/1999

* cited by examiner

*Primary Examiner* — Titus Wong
(74) *Attorney, Agent, or Firm* — Cesari and McKenna, LLP

(57) ABSTRACT

A method and apparatus of operating a Universal Serial Bus device to determine if a host sending Network Control Model Transfer Blocks (NTBs) is compliant with end of transfer rules for NTBs and to then determine appropriate operations at the device to complete transactions with a non-compliant host.

20 Claims, 5 Drawing Sheets

NETWORK CONTROL MODEL DRIVER

CROSS-REFERENCE TO RELATED APPLICATIONS

The present application claims the benefit of U.S. Provisional Patent Application Ser. No. 61/503,285, which was filed on Jun. 30, 2011, by Terrill M. Moore, et al. for a NETWORK CONTROL MODEL DRIVER and is hereby incorporated by reference.

BACKGROUND OF THE INVENTION

1. Field of the Invention

The invention relates to USB network class devices and hosts and in particular to network class devices and hosts operating over the Universal Serial Bus 3.0.

2. Background Information

The Superspeed Universal Serial Bus, USB3.0, allows host computers, commonly referred to as "hosts," and attached devices to communicate using data transfer rates that are many times higher than those available over its predecessor the USB2.0. The higher data transfer rates are particularly beneficial for network class devices. Network Control Model ("NCM") modules in the host and the attached network class device operate with network and bus protocol layers to efficiently encapsulate network data into NCM Transfer Blocks ("NTBs") and transport the NTBs over the USB as pluralities of serial bus packets.

The host and device agree on maximum NTB sizes for transfers over IN and OUT pipes, with the sizes differing for the respective pipes. The standard NCM module posts a receive request to the receiver containing one or more buffers with a total size as exactly the maximum NTB size agreed upon with the sender. The end of the transfer is indicated in the USB transmission by receipt of a maximum size NTB, i.e., an NTB that fills the buffer, or for non-maximum size NTBs, the receipt of one of the following USB packets: a USB packet containing less than the maximum amount of data, that is, a "short" packet; a USB packet containing no data, that is, a "zero length" packet or ZLP.

The USB controller at the receiving end of the transaction, for example, the USB controller in the attached device, readily processes maximum size NTBs when the full buffer flag is set, and processes the non-maximum NTBs when the device receives the associated end of transfer indicators. As appropriate, the device provides corresponding acknowledgments to the host. If all goes accordingly, the device thus processes the transfers without having to perform time consuming processing operations to determine the framing of the NTB in the data. The NTB transactions may thus be performed at the higher data transfer rates available over the USB3.0.

Various hosts, for example, hosts utilizing a particular Linux operating system kernel, do not provide the designated ends of transfer indicators for certain NTB transactions that are determined to be non-maximum transactions at the receiver. Rather the host has sent what it determines is a maximum size NTB, and therefore determines that an end of transfer indicator is not required.

The failure to provide the designated indicators adversely affects the transacting devices. The failure of the host to provide the expected end-of-transfer indicator for the non-maximum NTBs, means that the receiver cannot properly detect the end of the NTB, and the receiver will thus continue to receive the next NTB directly after the previous one into the same buffer or buffers that are designated to receive the NTBs. Therefore NCM framing synchronization will be lost, at least until the next time the host terminates a NTB with a short packet or a ZLP. All embedded frames during this period will thus be lost, with potentially severe consequences to the higher level protocol stacks.

What is needed is a mechanism that allows a receiver in an NTB transaction, in the example, an attached device, to determine if a sender, here a given host, is one that is compliant and provides the designated end-of-transfer indicators for NTB transactions that are non-maximum NTB transactions at the receiver. Further what is needed is a mechanism that allows devices to complete NTB transactions with the non-compliant host, and to complete them relatively efficiently.

SUMMARY OF THE INVENTION

A Network Control Model driver in an attached network class device operates a state machine that controls transfers of the NTBs to first determine if a host is compliant with end of transfer rules and to then determine appropriate operations at the device to complete the NTB transactions with a non-compliant host. In an initial state the network control model driver sets an attenuated receive size and restricts a request queue to a single transfer into one or more buffers. When the buffer or buffers periodically fill, the device inspects the transmitted data to determine if the host provides an appropriate designated end of transfer indicator for NTBs that are smaller than the maximum NTBs. If the device determines that the host does not provide the indicator, the device retains the attenuated receive size and allows the request queue to grow as fast as the device can manage, to essentially maximize the data transfer rate with the non-compliant host by minimizing the processing required at the device to determine the ends of the NTBs in the data.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
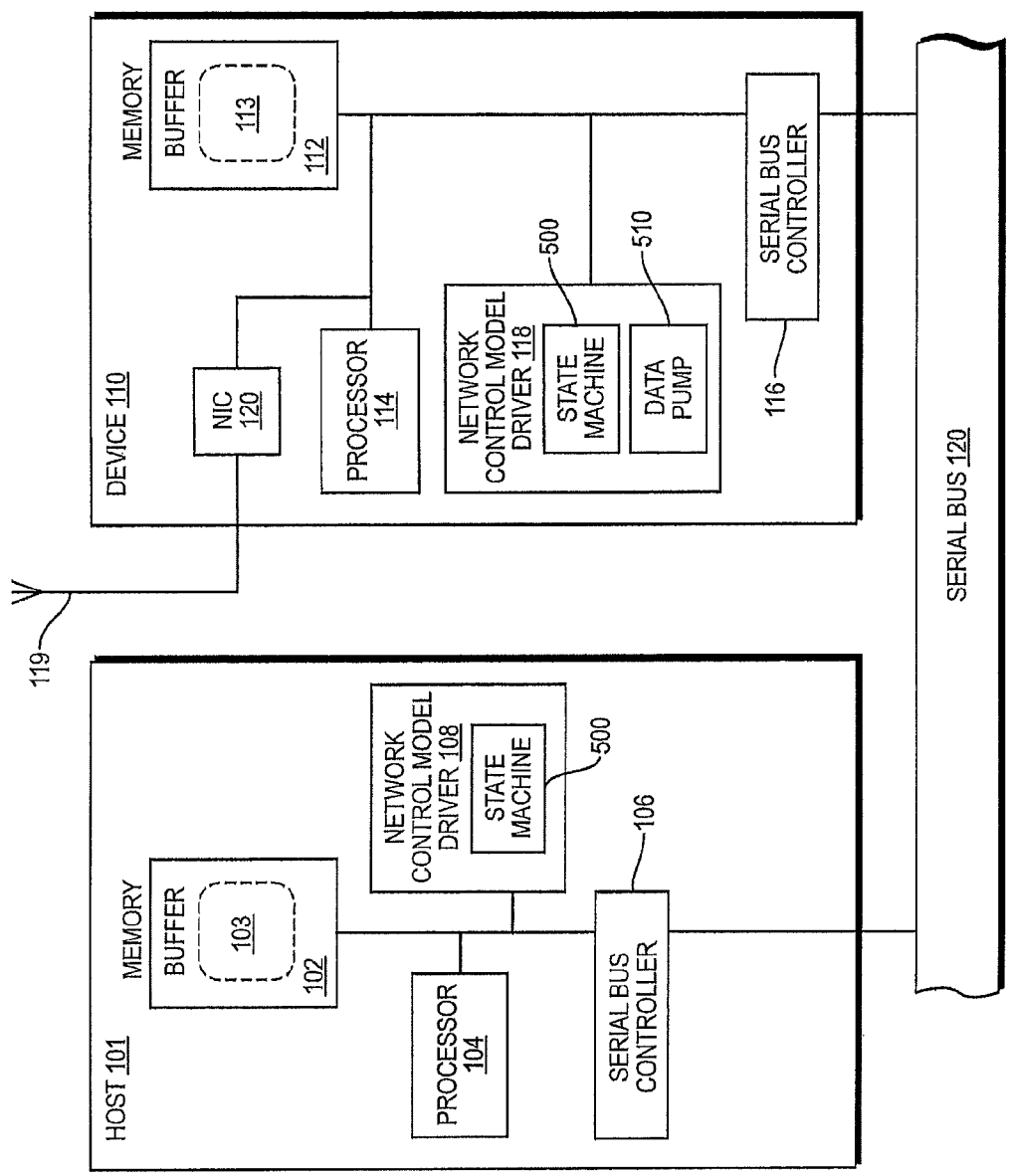
FIG. 1 is a functional block diagram of a system constructed in accordance with the invention.

Referring to FIG. 1, a host 101 communicates with one or more attached devices 110 over a serial bus 120. For ease of understanding, a host and one device are depicted in the drawing. However, multiple devices may be attached to the serial bus 120. The serial bus 120, in the example, is the USB 3.0 and communications between the host 101 and the device 110 over the bus are in accordance with transport protocols applicable to the USB 3.0. The transactions of interest are NCM Transfer Block (NTB) transactions and the device 110 is a network class device.

The host 101 includes a processor 104, a host memory 102, a host serial bus controller 106 and a host network control model driver 108 that operates with network and serial bus transport layers to transfer network data to the device 110 and receive network data from the device. The device 110 includes a processor 114, a device memory 112, a device serial bus controller 116, a device network control model driver 118, and a network interface controller 120 to communicate with an external network via an antenna 119 or by a wired connection (not shown).

The transactions of interest between the host 101 and the device 110 are transfers of data received from the network or to be provided to the network. The example transactions are described as transfers from the host to the attached device, though the same teachings are applicable to transfers from the device to the host.

The host and device network control model drivers 108, 118 operate with network and serial bus transport protocol stacks (not shown) to encapsulate the network data into NTBs and transport the respective NTBs over the serial bus as pluralities of serial bus packets, which are referred to hereinafter as USB packets. In the example, the network control model drivers operate in accordance with the *Universal Serial Bus Communication Class Subclass Specification for Network Control Model Devices*, version 1.0, hereinafter, the NCM Specification. As is understood by those skilled in the art, the host and device network control model drivers 108, 118 operate with protocol stacks that, in turn, operate together in a known manner to perform the encapsulation and packetization. The network control drivers also operate in known manners with the protocol stacks to provide the network data from the received packets and NTBs. The protocol stacks thus include network layer and serial bus transport layer drivers and so forth that operate in known manners and in accordance with known specifications.

In the device, the network control model driver 118 operates with a MCCI DataPump 510 that operatively controls data transfers in a known manner using requests that establish transfers to designated buffer or scatter gather buffers 113 and also associated signaling that denotes the completion of the requested transfer. As is understood, the buffers 113 and 103 may be contiguous storage locations comprising the total size of the buffer or may be scatter gather storage locations that together comprise the total size of the buffer. Hereinafter the term "buffer" will be used to denote either or both types of storage configurations. A MCCI DataPump may also be utilized by the host network control model driver, or the host network model driver may instead utilize the services of the host operating system operatively control the data transfers.

Figure 2A:
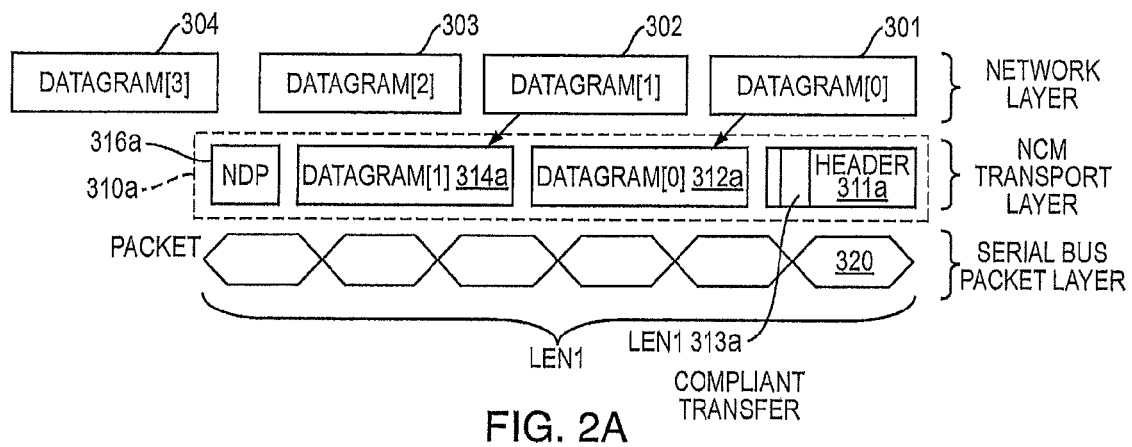
FIGS. 2A-C are illustrations of compliant transfers.
Figure 2B:
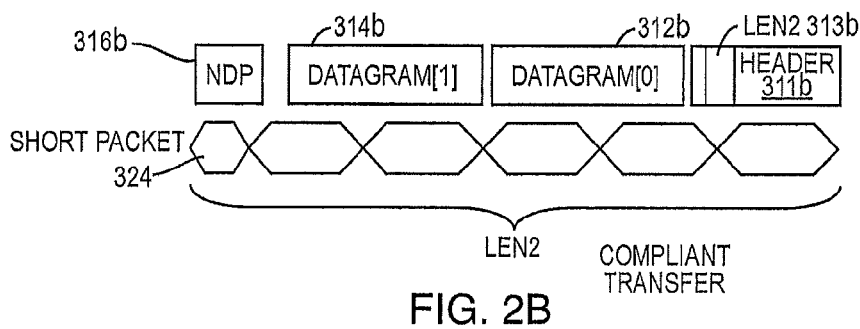
Figure 2C:
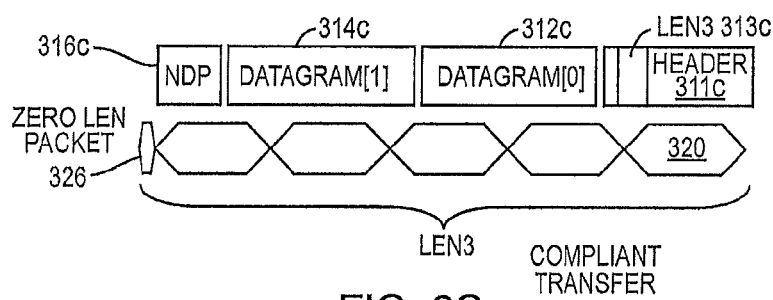

FIGS. 2A-C illustrate transactions on the serial bus 120 that are formulated in compliance with the NCM Specification. Referring now to FIG. 2A, the host network control model driver 108 encapsulates network data, in the example in the form of datagrams 301 and 302, in an NTB 310a. The NTB includes a header 311a that specifies, in a data-length field 313a, the total size of the datagrams encapsulated into the NTB 310a. At least one NCM Datagram Pointer structure 316 is included somewhere in the NTB. The network control model driver provides the NTB to the serial bus controller 116 as a plurality of USB packets 320. For the NTB transfer illustrated in FIG. 2A, the NTB header length field 313a has a value of LEN1, which is equal to the maximum NTB size. Accordingly, the sum of all packets from first packet 320 to the terminating packet 322 of the NTB transfer is identical in size to the total size of buffer 113 into which data are filled. The device serial bus controller 116 is configured to complete the transfer when the buffer full flag is set for the buffer 113.

Referring now to FIG. 2B, another example of an NCM Specification compliant NTB transfer is illustrated. In this example the value, LEN2, contained in the data-length field 313b of the header 311b is less than the maximum NTB size, and further the value is not a multiple of the fixed-size USB packet 320. Accordingly, a terminal packet 324 of the NTB contains less than the maximum length of data, that is, the terminal packet is a "short" packet. The device serial bus controller 116 is configured to complete a transfer when the controller encounters a short packet.

Referring now to FIG. 2C, yet another example of an NCM Specification compliant NTB transfer is illustrated. In this example, the data-length, LEN3, specified in the data length field 313b of the header 311c, is a multiple of the fixed-sized USB packet 320. The designated total size of the device buffer 113 is, however, larger than the size of the NTB. In this scenario, a ZLP 324 is provided, and the device serial bus controller is configured to complete a transfer when the controller encounters the ZLP.

Figure 3:
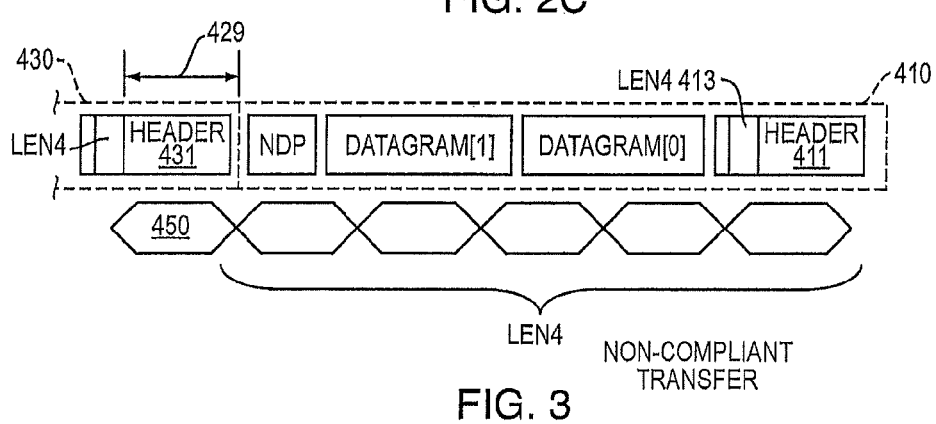
FIG. 3 is an illustration of a non-compliant transfer.

FIG. 3 illustrates a non-compliant NTB transfer. The data-length field 413 of the header 411 has a value LEN4 that is less than the maximum NTB size but is a multiple of the length of the serial bus packet. The device is configured to complete a transfer when the controller encounters a ZLP. The host, however, fails to produce a ZLP and instead produces a USB packet 450 containing the start 429 of the header 431 of a next NTB 430. The result is that NTB 430 will be stored immediately after NTB 410 in buffer 113, and when a proper end of transfer finally is detected, either that buffer 113 becomes full or a short packet or a ZLP is detected, then all NTB's in buffer 113 including NTB 410 will be discarded since received data length is not equal to LEN 4 of NTB 410. What is even worse is that LEN 4 in header 411 plus LEN 4 of header 431 may be larger than the maximum NTB size. This means that the device serial bus controller, which is configured to complete a transfer when maximum NTB size is received, will complete the transfer somewhere in the middle of NTB 430 and continue to receive the rest of NTB 430 into another buffer (not shown). The result is that any NTB's received into this other buffer will also be lost. Thus, the failure of the host to provide the end of packet indicator adversely affects the device operations that require the transferred data.

To overcome the problems of operating with a potentially non-compliant host, the device network control model driver 118 operates a state machine 500 to determine if the host 101 is one that performs non-compliant transfers, such as the transfer described with reference to FIG. 3, and to then optimize through-put rates of network data transfers with a non-compliant host. Before describing the mechanism, consider the well known enumeration of a device 110 to the host 101. The enumeration operation occurs at system startup, when the device 110 is attached to a system in which the host 101 is already operating, or when the device is reset. During enumeration of the device 110, the settings for respective interfaces for communicating with the host are established, and the device maintains the interface settings in a manner that is readable by the host 101. The respective interface settings for an interface for NTB transactions include a designated maximum NTB size that has been negotiated with the host. To transfer data between the host and the device 110, the host 101 selects the appropriate interface settings to configure the desired interface and establish an endpoint in the device 110 and an associated pipe. In accordance with the appropriate USB 3.0 specification, the endpoint is established when the host 101 issues a SET_INTERFACE command to the device 110.

As discussed above, non-compliant hosts are hosts that do not provide appropriate end of transfer indicators for the NTB transactions in which the NTBs are non-maximum size for the receiver but maximum size for the sender. The conditions for non-compliance occur when the host sets its designated buffer in the OUT pipe to a maximum NTB size that is smaller than the maximum NTB size at the receiver device, and is a multiple of USB packet size. The operation makes use of a Linux kernel that prompts the host to end the transaction at the maximum host buffer size, without sending a ZLP to the receiver.

In order to operate efficiently with a non-compliant host, the network control model driver 118 in the device 110 first identifies a given host 101 as compliant or non-compliant. Once the network control model driver determines the host is non-compliant, the network control model driver optimizes the network data transfer operations with the non-compliant host in order to eliminate loss of data, and to reduce processing inefficiencies.

Figure 4A:
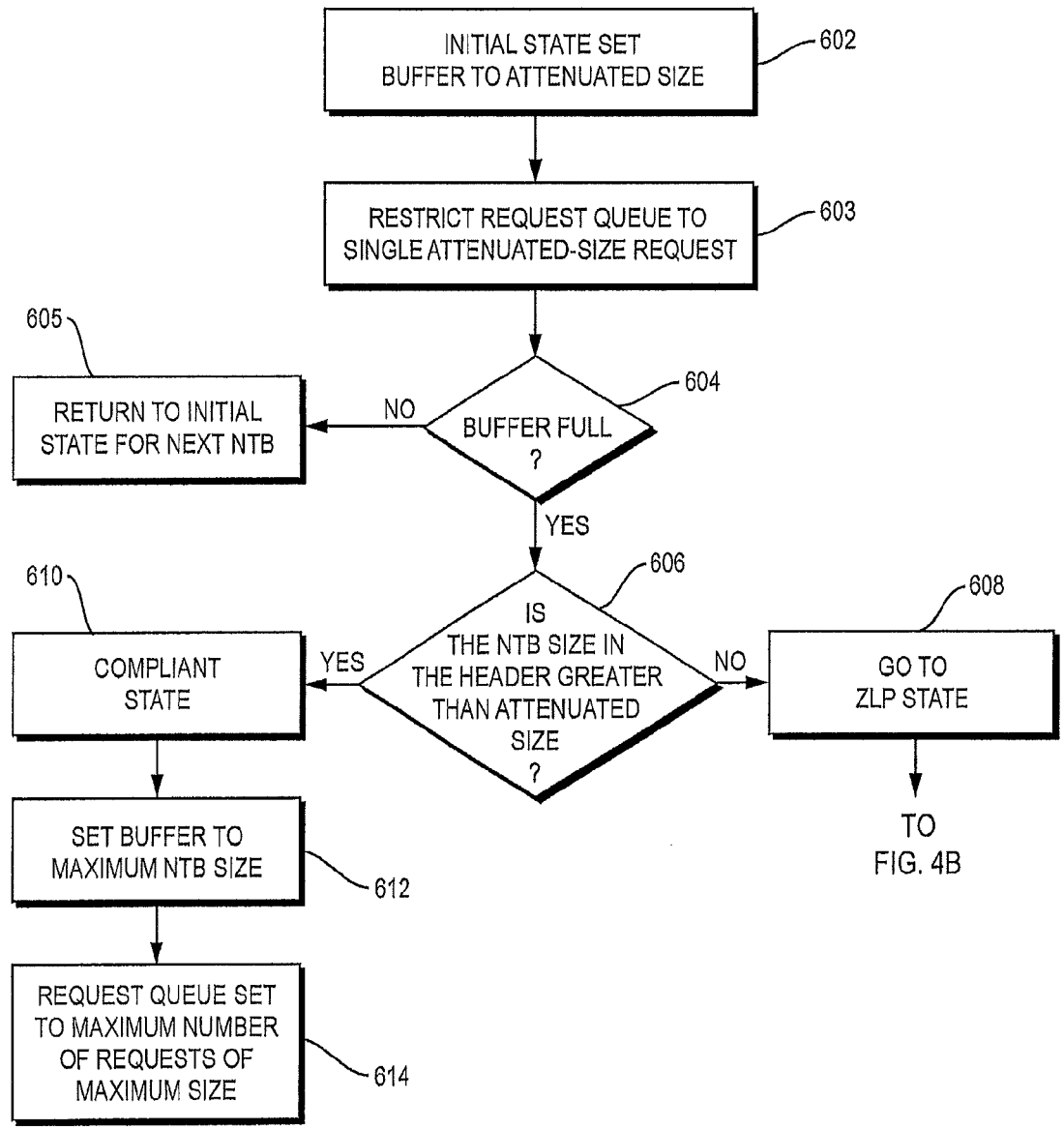
FIGS. 4A-B are a flowchart of operations of a state machine performed by the system of FIG. 1.
Figure 4B:
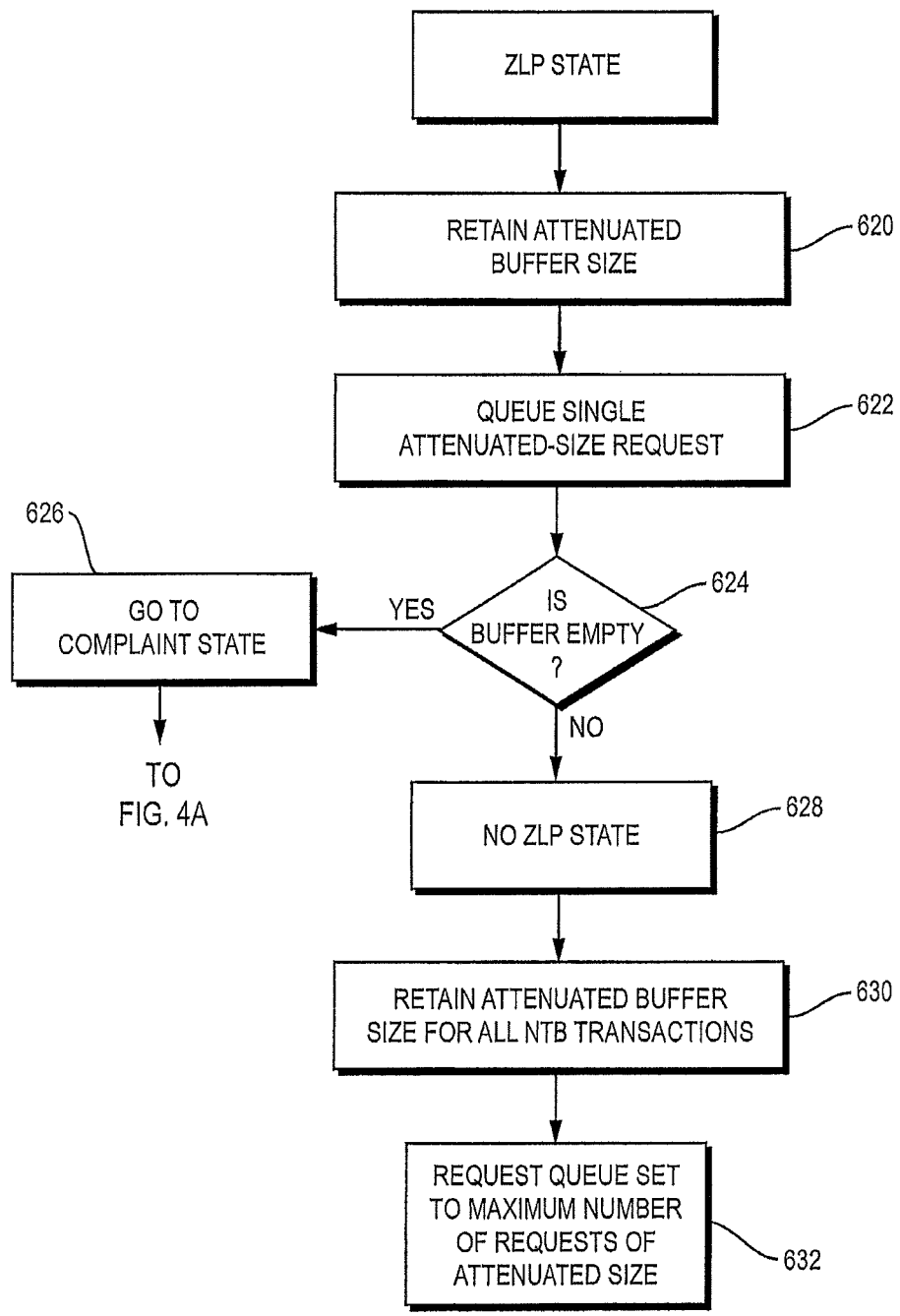
Figure 5:
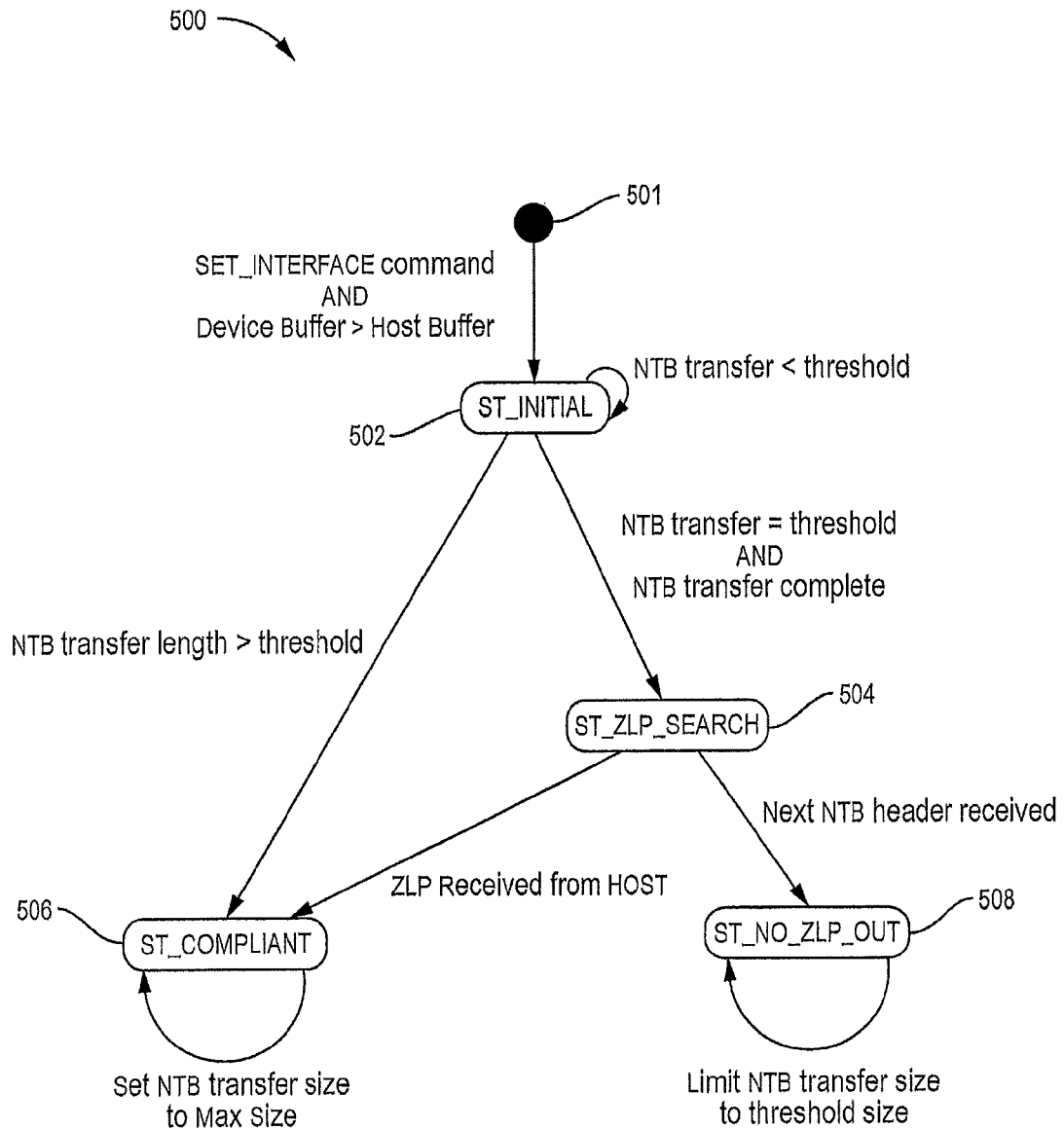
FIG. 5 illustrates the state machine of FIG. 4.

Referring now also to FIGS. 4-5, the device network control model driver operates a state machine 500 configured in software, firmware, hardware or a combination thereof, to first identify a non-compliant host and then configure an interface buffer setting and a request queue at the device to ensure completion of the transaction and optimize the through-put thereof.

The device starts the state machine 500 at a state 501 when a first NTB transaction is initiated by the host after the enumeration of the device. The state machine that goes to an INITIAL state 502 in which the buffer 113 designated for receipt of the NTB transaction at the device is attenuated to a predetermined threshold size, which is less than the agreed maximum size for the NTBs during enumeration. Step 602. In the example, the maximum NTB size is 64 k. The host 101 in the example is a Linux host, and the total size of the device buffer 113 is attenuated to 16K, which is the maximum size to which the host buffer 103 is set by a non-compliant host. More generally, the size of the buffer 113 may be attenuated to any value equal to or below a predetermined threshold for the non-compliant behavior, if such a threshold can be determined. Alternatively, the size of the buffer 113 can be attenuated to a size that allows for relatively quick inspection of the data contained therein by the device to determine the ends of the NTBs in the data in order to set a maximum size for the buffer at the receiver.

The state machine also modifies the request queue to a length of a single request. Step 603. Once the host responds to the single request, the device provides an appropriate response to the host. If the buffer is not full the transaction ended with a NTB that is smaller than the maximum NTB size of the non-compliant host, based on a short packet or ZLP. The state machine returns to the initial state to test for compliance with a next NTB, since even a non-compliant host issues a short packet or ZLP for a NTB that is smaller in size than the non-compliant host NTB size. Steps 604, 605. If the buffer is full, the buffer full flag is set and in response the device then inspects the data in the attenuated-size designated buffer 113, that is, in the first 16 k of the NTB. Steps 604, 605. The device determines from the header in the NTB, which is contained in the buffer, if the NTB size specified in the data length field of the header is equal to the total size of the attenuated buffer, that is, if the NTB size is, in the example, 16 k. Step 606. If the block size is equal to the data transferred, the device enters a ZLP search state, since the received NTB is smaller than the agreed-on maximum NTB and, in compliance with NCM Specification, the transfer must be ended with a ZLP. The ZLP should therefore be in the next 16 k transfer. Steps 606, 608.

In the ZLP search state, the total buffer size remains attenuated to 16 k and the device again queues a single request for a 16K transfer. Steps 620, 622. When the transfer is again completed, the device determines if only a ZLP was received. Step 624. If so, the device determines that the host is compliant and enters the COMPLIANT state. Step 626. Otherwise, the device determines that the host is non-compliant for failing to send only the ZLP, and the device enters a NOZLP state. Step 628. In this state the total size of device buffer 113 is set to the attenuated size, in the example 16K, for all NTB transactions. However, the queue for requests for transfer is no longer restricted to a single request and the device queues the 16K requests as fast as the device can process them. Steps 630, 632.

The device than processes the maximum size, here 16 k, NTBs from the host based on the buffer full flags set for the attenuated sized buffer or buffers 113, or short packets or ZLPs received when the host sends less than the 16 k maximum sized NTBs, since the buffer sizes at the host and device are the same size. Accordingly, the NTB framing will be synchronous with the buffers.

If the NTB length specified in the NTB header is greater than 16K, which in the example is the predetermined maximum value used by the non-compliant hosts, the state machine sets the state to COMPLAINT. Steps 606, 610. This transition in the state machine occurs because the host sending NTBs of size greater than the threshold NTB size of the non-compliant host is, by definition, a compliant host that sets its NTB based on the agreed upon maximum NTB size. If the amount of data received is less than the data requested, a short packet or ZLP is received and the device cannot determine if the host is compliant. The device processes the data transfer and remains in the initial state to test compliance with a next NTB. Steps 604, 605.

In the compliant state, the network control model driver 118 sets the total size of the buffer 113 to the agreed maximum NTB size and removes the restriction on the request queue. The device then queues requests for transfer to the maximum NTB size as fast as possible.

The operations and associated hardware, software and firmware of the state machine may occur at the host or device as discussed above. The depiction of the state machine in the device only in the drawings is non-limiting. Processing performed in single functional blocks in the drawings may be performed in single or multiple processors. Similarly, processing performed in multiple functional blocks in the drawings may be performed in single or multiple processors.

What is claimed is:

1. A method for communicating a first and second request using a protocol between a host system and a device, comprising:
   negotiating at the device a maximum transfer size for the first request;
   in response to negotiating the maximum transfer size for the first request, reducing a total size of a set of one or more receive buffers at the device to an attenuated total smaller than the maximum transfer size;
   determining at the device whether the host sends an end-of-transfer indicator for the first request; and
   in response to determining at the device that the host does not send an end-of-transfer indicator for the first request, waiting for the end-of-transfer indicator in the second request to thereby complete the first request, wherein the attenuated total size for the set of receive buffers is retained.

2. The method of claim 1, wherein the set of receive buffers with the attenuated total size holds one request at a time.

3. The method of claim 1 further comprising:
   growing a request queue to hold a plurality of requests.

4. The method of claim 1, wherein a transfer comprises packets selected from a group consisting of a fixed sized packet, a short packet smaller than the fixed sized packet, a zero data length packet, and combinations thereof.

5. The method of claim 4 further comprising:
receiving the transfer having a transfer size in a header greater than the attenuated total size for the set of receive buffers, thereby completing the first request; and
setting the total size of the set of receive buffers to the maximum transfer size.

6. The method of claim 1 wherein the protocol comprises a Universal Serial Bus Protocol.

7. The method of claim 6 wherein the request comprises a Network Control Model Transfer Block.

8. The method of claim 1 further comprising:
receiving a transfer of the first request having a transfer size in a header less than or equal to the attenuated total size of the set of receive buffers;
receiving a next transfer of zero data length, thereby completing the first request; and
setting the total size of the set of receive buffers to the maximum transfer size.

9. The method of claim 1 further comprising:
receiving a transfer of the first request having a transfer size in a header less than or equal to the attenuated total size of the set of receive buffers;
receiving a next transfer having a next transfer size in a next header greater than zero; and
waiting for the end-of-transfer indicator to thereby complete the first request, wherein the attenuated total size for the set of receive buffers is retained.

10. A first device communicating a first and second Network Control Module Transfer Block (NTB) over a serial bus using a Network Control Module (NCM) protocol to a second device, the first device comprising:
a serial bus interface; and
a controller adapted to:
negotiate at the first device a maximum transfer size for the NCM protocol;
in response to negotiating at the first device the maximum transfer size for the NCM protocol, reduce a total size of a set of receive buffers at the first device to an attenuated total size smaller than the maximum transfer size;
determine at the first device whether the second device sends an end-of-transfer indicator for the first NTB; and
in response to determining that the second device does not send an end-of-transfer indicator for the first NTB, waiting for the end-of-transfer indicator in the second NTB to thereby complete the first NTB, wherein the attenuated total size for the set of receive buffers is retained.

11. The first device of claim 10, wherein the set of receive buffers with the attenuated total size holds a one NTB at a time.

12. The first device of claim 10, the controller further adapted to grow a request queue to hold a plurality of NTBs.

13. The first device of claim 10, the controller further adapted to:
receive a transfer of the first NTB having a transfer size in a header greater than the attenuated total size for the set of receive buffers; and
set the total size of the set of receive buffers to the maximum transfer size.

14. The first device of claim 10, wherein the protocol comprises a Universal Serial Bus Protocol.

15. The first device of claim 10, the controller further adapted to:
receive a transfer of the first NTB having a transfer size in a header less than or equal to the attenuated total size of the set of receive buffers;
receive a next transfer of zero data length, thereby completing the first NTB; and
set the total size of the set of receive buffers to the maximum transfer size.

16. The first device of claim 10, the controller further adapted to:
receive a transfer of the first NTB having a transfer size in a header less than or equal to the attenuated total size of the set of receive buffers;
receive a transfer having a transfer size in a header greater than zero; and
waiting for the end-of-transfer indicator to thereby complete the first NTB, wherein the attenuated total size for the set of receive buffers is retained.

17. The first device of claim 10, the controller further configured to:
determine whether the set of receive buffers is empty; and
in response to determining that the set of receive buffers is empty, retain the attenuated size for the receive buffer.

18. A method for communicating a request using a Universal Serial Bus protocol, comprising:
negotiating a maximum transfer size for the request;
in response to negotiating the maximum transfer size for the request, setting a set of one or more receive buffers to a attenuated total size smaller than the maximum transfer size;
receiving a transfer of the request having a transfer size less than or equal to the attenuated size;
in response to receiving the transfer having a transfer size less than or equal to the attenuated total size, determining whether the set of receive buffers is empty; and
in response to determining that the set of receive buffers is not empty, waiting for an end-of-transfer indicator to thereby complete the request, wherein the attenuated total size for the set of receive buffers is retained.

19. A method for communicating a request using a Universal Serial Bus protocol, comprising:
negotiating at a device a maximum transfer size for the request;
in response to negotiating the maximum transfer size for the request, setting a set of one or more receive buffers at the device to an attenuated total size smaller than the maximum transfer size, wherein a request queue is set to hold only one request at a time;
receiving a transfer of the request having a transfer size less than or equal to the attenuated total size;
receiving a transfer of zero data length, thereby completing the request;
increasing the request queue to hold two or more requests; and
setting the total size of the set of receive buffers to the maximum transfer size.

20. A non-transitory computer readable medium containing executable program instructions for execution by a processor, comprising:
program instructions that negotiate at device a maximum transfer size for a request using a Universal Serial Bus protocol;
program instructions that set at the device a set of one or more receive buffers to an attenuated total size smaller than the maximum transfer size;
program instructions that receive at the device a transfer of the request having a transfer size less than or equal to the attenuated size;

program instructions that determine whether the set of receive buffers is empty; and program instructions that in response to determining that the set of receive buffers is not empty, waiting for an end-of-transfer indicator to thereby complete the request, wherein the attenuated total size for the receive buffers is retained.

\* \* \* \* \*

UNITED STATES PATENT AND TRADEMARK OFFICE
CERTIFICATE OF CORRECTION

PATENT NO. : 8,904,062 B2
APPLICATION NO. : 13/537158
DATED : December 2, 2014
INVENTOR(S) : Terrill M. Moore et al.

Page 1 of 1

It is certified that error appears in the above-identified patent and that said Letters Patent is hereby corrected as shown below:

In the Claims:

Claim 1, Col 6, line 51 should read:
size smaller than the maximum transfer size;

Signed and Sealed this
Second Day of June, 2015

Michelle K. Lee
*Director of the United States Patent and Trademark Office*